J. N. TYPPI.
VEHICLE CONSTRUCTION.
APPLICATION FILED MAY 3, 1917.
1,300,055.
Patented Apr. 8, 1919.
2 SHEETS—SHEET 1.
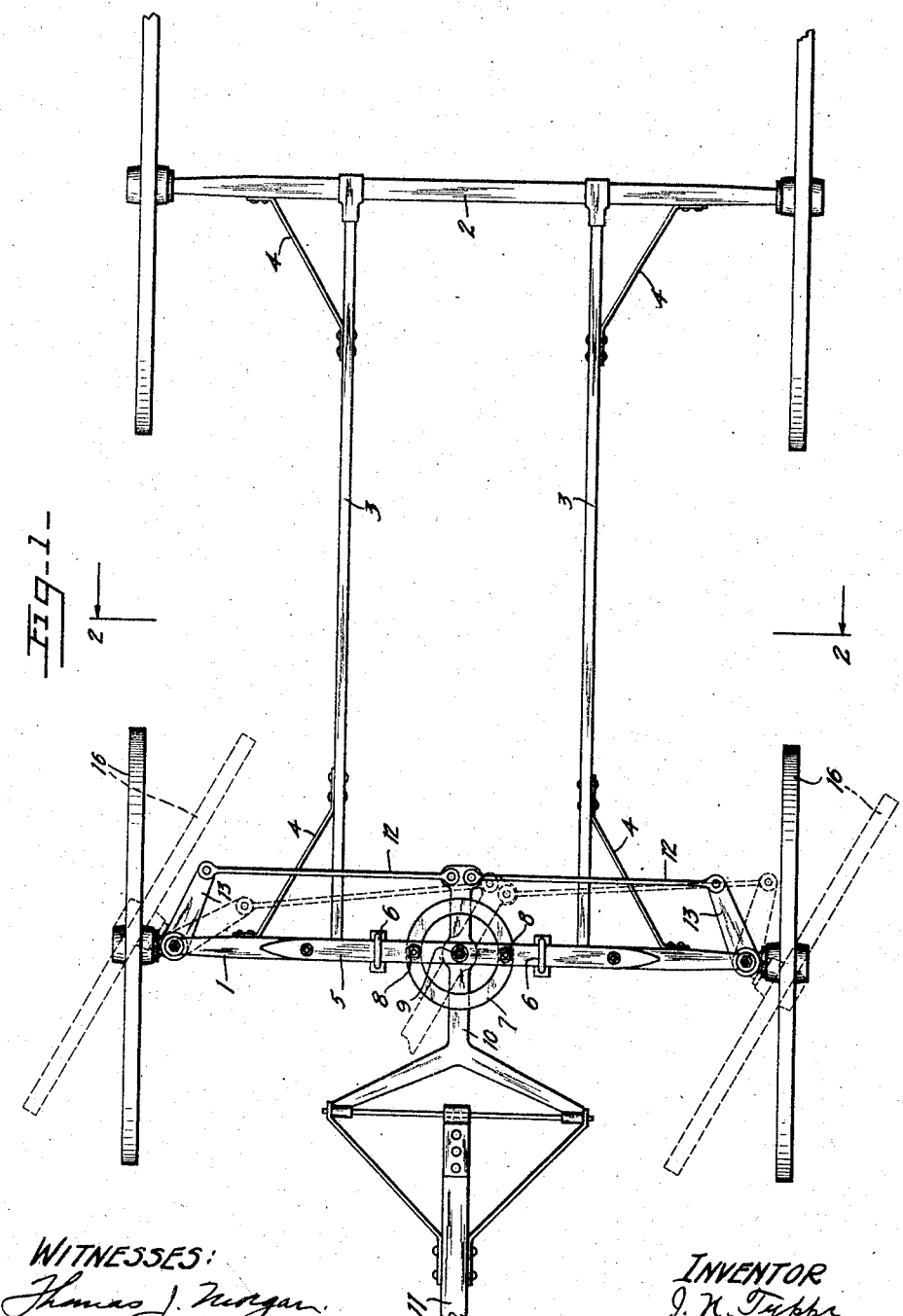

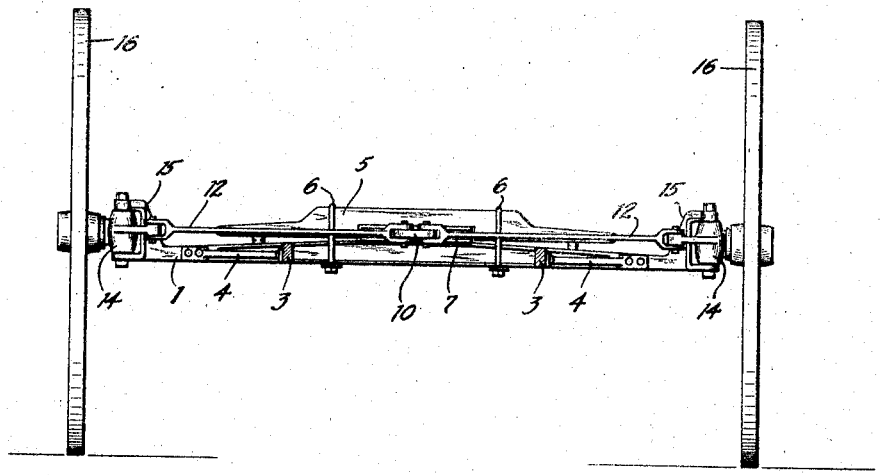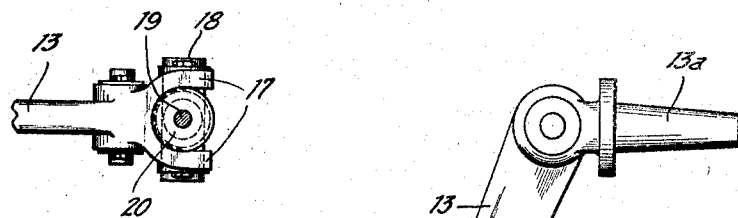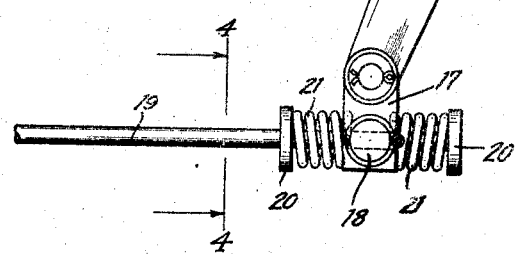

UNITED STATES PATENT OFFICE.

JOHN NIKOLAI TYPPI, OF IRON BELT, WISCONSIN.

VEHICLE CONSTRUCTION.

1,300,055. Specification of Letters Patent. Patented Apr. 8, 1919.

Application filed May 3, 1917. Serial No. 166,164.

*To all whom it may concern:*

Be it known that I, JOHN NIKOLAI TYPPI, a citizen of the United States, residing at Iron Belt, in the county of Iron and State of Wisconsin, have invented certain new and useful Improvements in Vehicle Construction, of which the following is a specification.

This invention relates to improvements in vehicle construction and more particularly to light buggy construction. One object is to provide a vehicle adapted to be drawn by draft animals and to provide the front axle with steering knuckles upon which the front wheels are mounted and which are operatively connected to the shaft supporting member so that the wheels will be turned with and by the turning of the tongue or shaft. A further object is to provide a novel form of connection for the steering knuckle which will act as a shock absorber to take up the jolt incident to travel over rough roads.

With the foregoing and other objects in view the invention consists in the combination and arrangement of parts to be hereinafter fully described, pointed out in the appended claim and illustrated in the accompanying drawings which form a part of this specification, and in which—

Figure 1 is a plan view of a vehicle constructed according to my invention.

Fig. 2 is a section on line 2—2 of Fig. 1.

Fig. 3 is an enlarged detail view of a modified form of steering knuckle connection.

Fig. 4 is a section on line 4—4 of Fig. 3.

Like reference characters denote corresponding parts throughout.

The reference numeral 1 denotes the front axle and 2 the rear axle of the vehicle and 3 the reach rods connecting said axles which rods are further connected to said axles by the brace bars 4. The usual bolster 5 is connected by straps 6 to the axle 1 and to the fifth wheel 7 by bolts 8, and to the axle 1 by the draw bolt 9 which also passes through and pivotally engages the arm 10 that carries the shaft 11. To the said arm 10 rods 12 are secured which are pivotally connected to the links 13 which links (in the Figs. 1 and 2) are integral with the knuckles 14 journaled in the bifurcated ends 15 of the said shaft 1, which knuckles are directly connected to the front wheels 16.

In Figs. 3 and 4 the links 13 are rigidly connected to stub axles 13ª and to the knuckles 17 through the posts 18 of which the rods 19 extend, said rods 19 being provided upon opposite sides of said post 18 with the stop collars 20 between which and the said post 18 coil springs 21 are positioned upon the said rods. The rods are movable with relation to the posts 18 so that sudden jerks of said rods are not positively imparted to the said knuckles.

What is claimed is:—

The combination with a vehicle axle having bifurcated ends, of stub axles pivotally mounted therein, wheels carried by said stub axles, an arm pivotally connected to said vehicle axle, rods pivotally carried by said arm and extending therefrom in opposite directions, knuckles, posts slidably connecting said rods and knuckles, spaced stop collars arranged upon said rods upon opposite sides of said posts, and expansion springs arranged upon said rods and abutting said stop collars and said posts for yieldingly retaining the latter midway between said stop collars.

In testimony that I claim the foregoing as my own I have hereto affixed my signature in the presence of two subscribing witnesses.

JOHN NIKOLAI TYPPI.

Witnesses:
 OSCAR GUSTAFSON,
 HENRY ESKOLA.

Copies of this patent may be obtained for five cents each, by addressing the "Commissioner of Patents, Washington, D. C."